US010965194B2

(12) United States Patent
Kitahara (10) Patent No.: US 10,965,194 B2
(45) Date of Patent: Mar. 30, 2021

(54) HEAT PIPE, ROTOR, AND ROTARY ELECTRIC MACHINE

(71) Applicant: HONDA MOTOR CO., LTD., Tokyo (JP)

(72) Inventor: Takashi Kitahara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/292,399

(22) Filed: Mar. 5, 2019

(65) Prior Publication Data

US 2019/0280565 A1 Sep. 12, 2019

(30) Foreign Application Priority Data

Mar. 9, 2018 (JP) .............................. JP2018-043188

(51) Int. Cl.
*H02K 9/20* (2006.01)
*H02K 1/32* (2006.01)

(52) U.S. Cl.
CPC ................. *H02K 9/20* (2013.01); *H02K 1/32* (2013.01)

(58) Field of Classification Search
CPC .. H02K 9/00; H02K 9/06; H02K 9/10; H02K 9/16; H02K 9/19; H02K 9/20; H02K 1/27; H02K 1/32
See application file for complete search history.

(56) References Cited

U.S. PATENT DOCUMENTS

| 3,801,843 A | 4/1974 | Corman et al. | |
|---|---|---|---|
| 2004/0155539 A1* | 8/2004 | Potoradi | ................. F28D 15/02 310/58 |
| 2016/0079814 A1* | 3/2016 | Lacroix | ................. H02K 1/2766 310/59 |

FOREIGN PATENT DOCUMENTS

| CN | 201724586 | 1/2011 |
|---|---|---|
| CN | 203491850 | 3/2014 |
| CN | 104266516 | 1/2015 |
| GB | 2471452 | 1/2011 |
| JP | 01-306799 | 12/1989 |
| JP | 2007-124805 | 5/2007 |
| JP | 2008-511271 | 4/2008 |
| WO | 2006-033729 | 3/2006 |

OTHER PUBLICATIONS

Chinese Office Action for Chinese Patent Application No. 201910162115.3 dated Apr. 27, 2020.
Chinese Notice of Allowance for Chinese Patent Application No. 201910162115.3 dated Oct. 12, 2020.

* cited by examiner

*Primary Examiner* — Tran N Nguyen
(74) *Attorney, Agent, or Firm* — Amin, Turocy & Watson, LLP (57) ABSTRACT

A rotor includes: a rotor core; a magnet that is arranged along an axial direction of a central axis of the rotor core; and a heat pipe that is arranged around the central axis of the rotor core, wherein the heat pipe includes: an operation liquid that is provided in an internal space of the heat pipe and that allows heat to move via evaporation and condensation; a heated part that extends so as to be parallel with the central axis, that receives heat from the magnet, and that is heated; and a cooled part that is arranged on one side in a longitudinal direction of the heated part and that is cooled, wherein the cooled part is slanted away from the central axis of the rotor core in a direction from the one side in the longitudinal direction of the heated part toward another side in the longitudinal direction of the heated part.

5 Claims, 4 Drawing Sheets

HEAT PIPE, ROTOR, AND ROTARY ELECTRIC MACHINE

CROSS-REFERENCE TO RELATED APPLICATION

Priority is claimed on Japanese Patent Application No. 2018-043188, filed on Mar. 9, 2018, the contents of which are incorporated herein by reference.

BACKGROUND

Field of the Invention

The present invention relates to a heat pipe, a rotor, and a rotary electric machine.

Background

In the related art, a rotary electric machine is used as a power source of a hybrid automobile and an electric automobile. In the rotary electric machine, by a current being supplied to a coil, a magnetic field is formed on a stator core, and a magnetic attraction force or repulsion force is generated between the stator core and a permanent magnet of a rotor. Thereby, the rotor is rotated relative to the stator.

It is known that the temperature of the permanent magnet is increased due to heat generation by an eddy current, heat reception from the coil, and the like. When the temperate of the permanent magnet becomes higher than a predetermined temperature, the magnetic force of the permanent magnet may be degraded. Accordingly, a variety of techniques for cooling the permanent magnet have been proposed.

For example, in Japanese Patent Application, Publication No. 2007-124805A, a motor cooling structure is described which includes a heat circulation device (a heat pipe) that is provided from the inside of a rotor to the opposite side of the output of a motor and a heat release means that is provided on the opposite side of the output of the motor and that releases heat which is transmitted by the heat circulation device. It is disclosed that, according to the technique described in Japanese Patent Application, Publication No. 2007-124805A, the heat that is generated at a rotor part is directly received by the operation of the heat release means and the heat circulation device provided inside the rotor, and it is possible to effectively prevent the temperature increase of the rotor.

In Published Japanese Translation No. 2008-511271, a power transmission device is described which includes a stator core that includes a soft magnetic complex material, a winding wire that is formed on a pole of the stator core, and a heat pipe that is mounted inside the stator core. It is disclosed that, according to the technique described in Published Japanese Translation No. 2008-511271, by providing a heat pipe at the center of the stator core or on a recess-shaped boundary layer between the stator core and the winding wire, it is possible to maintain the stator core and an excitation winding wire to be at a desired temperature.

SUMMARY

However, in the above technologies described in Published Japanese Translation No. 2007-124805 and Published Japanese Translation No. 2008-511271, a heat pipe using a capillarity as an operation principle is used, and therefore, there is a possibility that it may be impossible to effectively perform a cooling when a strong centrifugal force is applied on the heat pipe. Accordingly, in the related art, there is a problem of providing a heat pipe, a rotor, and a rotary electric machine that are capable of effectively performing a cooling in an environment in which a strong centrifugal force works.

An object of an aspect of the present invention is to provide a heat pipe, a rotor, and a rotary electric machine that are capable of effectively performing a cooling in an environment in which a strong centrifugal force works.

(1) A heat pipe according to an aspect of the present invention is a heat pipe that is arranged around a central axis of a rotation body, the heat pipe including: an operation liquid that is provided in an internal space of the heat pipe and that allows heat to move via evaporation and condensation; a heated part that extends so as to be parallel with the central axis, that receives heat from a heat generation body which is included in the rotation body, and that is heated; and a cooled part that is arranged on one side in a longitudinal direction of the heated part and that is cooled, wherein the cooled part is slanted away from the central axis of the rotation body in a direction from the one side in the longitudinal direction of the heated part toward another side in the longitudinal direction of the heated part.

(2) The above heat pipe may include a film body that is provided throughout the heated part and the cooled part, that divides the internal space into a first space in which the operation liquid is present and a second space in which an operation liquid vapor is present, and that is capable of performing a gas-liquid separation, wherein the film body may be slanted away from the central axis of the rotation body from the one side toward the other side.

(3) A rotor according to another aspect of the present invention includes: a rotor core; a magnet that is arranged along an axial direction of a central axis of the rotor core; and a heat pipe that is arranged around the central axis of the rotor core, wherein the heat pipe includes: an operation liquid that is provided in an internal space of the heat pipe and that allows heat to move via evaporation and condensation; a heated part that extends so as to be parallel with the central axis, that receives heat from the magnet, and that is heated; and a cooled part that is arranged on one side in a longitudinal direction of the heated part and that is cooled, wherein the cooled part is slanted away from the central axis of the rotor core in a direction from the one side in the longitudinal direction of the heated part toward another side in the longitudinal direction of the heated part.

(4) The above rotor may include a film body that is provided throughout the heated part and the cooled part, that divides the internal space into a first space in which the operation liquid is present and a second space in which an operation liquid vapor is present, and that is capable of performing a gas-liquid separation, wherein the film body may be slanted away from the central axis of the rotor core from the one side toward the other side.

(5) In the above rotor, the heated part may be arranged inside the rotor, the cooled part may be arranged outside the rotor, and the heated part may be in contact with the magnet.

(6) A rotary electric machine according to still another aspect of the present invention includes the above rotor.

The heat pipe of the configuration (1) described above includes the heated part that extends so as to be parallel with the central axis of the rotation body and the cooled part that is arranged on one side in the longitudinal direction of the heated part, and the cooled part is slanted away from the central axis of the rotation body from the one side in the longitudinal direction toward another side. Therefore, the operation liquid vapor that is evaporated at the heated part in the internal space of the heat pipe moves to the cooled part due to a pressure difference, is then cooled at the cooled part, becomes a liquid (that is, the operation liquid) again, moves propagating on a wall surface of the cooled part due to a centrifugal force, and is supplied to the heated part. Thereby, compared to the related art, the operation liquid is able to effectively cool the heat generation body. Therefore, according to the configuration (1) described above, it is possible to provide a heat pipe that is capable of effectively performing a cooling in an environment in which a strong centrifugal force works.

According to the heat pipe of the configuration (2) described above, the film body that is provided throughout the heated part and the cooled part, that divides the internal space into the first space in which the operation liquid is present and the second space in which the operation liquid vapor is present, and that is capable of performing a gas-liquid separation is slanted away from the central axis of the rotation body from the one side toward the other side. Therefore, the operation liquid vapor that is evaporated in the first space at the heated part passes through the film body, moves from the first space to the second space, moves to the cooled part due to a pressure difference, is then cooled in the first space at the cooled part, becomes a liquid (that is, the operation liquid) again, moves propagating on a film body surface in the first space due to a centrifugal force, and is supplied to the heated part. Thereby, compared to the related art, the operation liquid is able to effectively cool the heat generation body. Therefore, according to the configuration (2) described above, it is possible to provide a heat pipe that is capable of effectively performing a cooling in an environment in which a strong centrifugal force works.

The rotor of the configuration (3) described above includes the magnet that is arranged along the axial direction of the central axis of the rotor core and the heat pipe that is arranged around the central axis of the rotor core, the heat pipe includes the heated part that extends so as to be parallel with the central axis of the rotor core and the cooled part that is arranged on one side in the longitudinal direction of the heated part, and the cooled part is slanted away from the central axis of the rotor core from the one side in the longitudinal direction toward another side. Therefore, the operation liquid vapor that is evaporated at the heated part moves to the cooled part due to a pressure difference, is then cooled at the cooled part, becomes a liquid (that is, the operation liquid) again, moves propagating on a wall surface of the cooled part due to a centrifugal force, and is supplied to the heated part. Further, at least part of the heat that is generated at the magnet is absorbed by the heated part. Thereby, compared to the related art, the operation liquid is able to effectively cool the magnet. Therefore, according to the configuration (3) described above, it is possible to provide a rotor that is capable of effectively performing a cooling during the rotation of the rotor in which a strong centrifugal force works.

The rotor of the configuration (4) described above includes the magnet that is arranged along the axial direction of the central axis of the rotor core and the heat pipe that is arranged around the central axis of the rotor core, the heat pipe includes the film body that is provided throughout the heated part and the cooled part, and the film body is slanted away from the central axis of the rotation body from the one side toward the other side. Therefore, the operation liquid vapor that is evaporated in the first space at the heated part passes through the film body, moves from the first space to the second space, moves to the cooled part due to a pressure difference, is then cooled in the first space at the cooled part, becomes a liquid (that is, the operation liquid) again, moves propagating on a film body surface in the first space due to a centrifugal force, and is supplied to the heated part. Further, at least part of the heat that is generated at the magnet is absorbed by the heated part.

Thereby, compared to the related art, the operation liquid is able to effectively cool the magnet. Therefore, according to the configuration (4) described above, it is possible to provide a rotor that is capable of effectively performing a cooling during the rotation of the rotor in which a strong centrifugal force works.

According to the rotor of the configuration (5) described above, the heated part is in contact with the magnet, the heated part is arranged inside the rotor, and the cooled part is arranged outside the rotor. Therefore, the heated part directly cools the magnet, and the cooled part is exposed to the outside of the rotor at a lower temperature than the inside of the rotor and further effectively releases heat that is received by the heated part. Thereby, the heat pipe is able to directly receive the heat of the magnet, and it is possible to effectively cool the magnet compared to the related art.

Specifically, when the rotor of the configuration (5) described above is applied to a rotary electric machine having a cooling means using a refrigerant liquid, the cooled part is cooled also by the coolant liquid, and therefore, it is possible to provide a rotor having a further high-performance cooling structure.

According to the rotary electric machine of the configuration (6) described above, it is possible to provide a rotary electric machine that includes a rotor capable of effectively performing a cooling compared to the related art and that has a high cooling performance.

DESCRIPTION OF THE EMBODIMENTS

Hereinafter, embodiments of the present invention will be described with reference to the drawings.

First Embodiment

Figure 1:
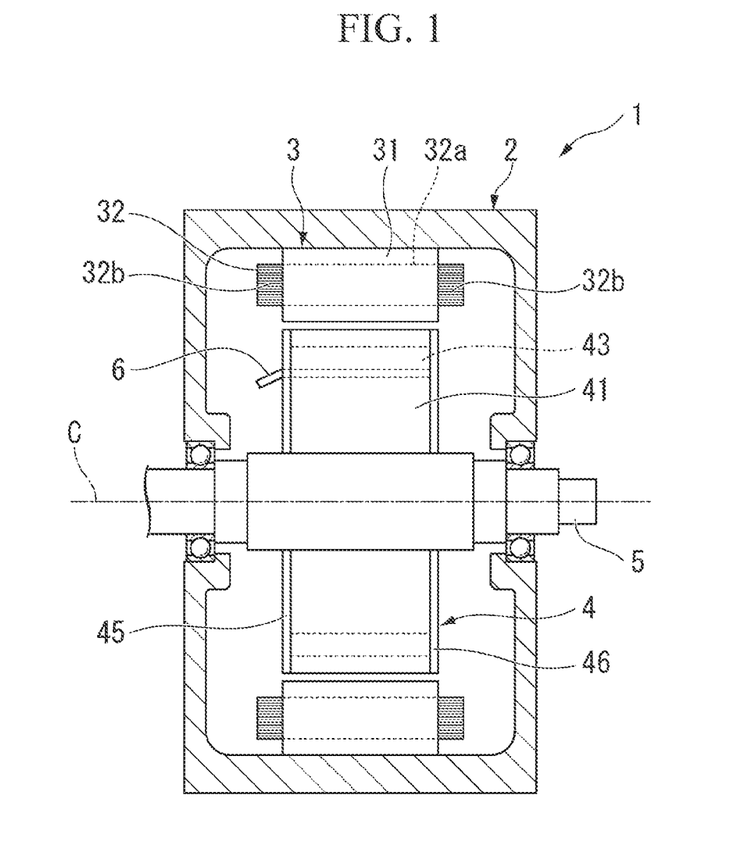
FIG. 1 is a cross-sectional view showing a schematic configuration of a rotary electric machine according to a first embodiment.

FIG. 1 is a cross-sectional view showing a schematic configuration of a rotary electric machine according to a first embodiment.

A rotary electric machine 1 shown in FIG. 1 is, for example, a travel motor that is mounted on a vehicle such as a hybrid automobile and an electric automobile. However, the configurations of embodiments are not limited to the example described above and can be applied also to a motor for another application such as a power generation motor that is mounted on a vehicle. Further, the configurations of embodiments can be applied to any so-called rotary electric machine that includes an electric generator and that is other than a rotary electric machine which is mounted on a vehicle.

The rotary electric machine 1 includes a case 2, a stator 3, a rotor 4 (rotation body), and an output shaft 5.

The case 2 accommodates the stator 3, the rotor 4, and the output shaft 5. A refrigerant (not shown) is accommodated inside the case 2. The stator 3 described above is arranged inside the case 2 in a state where part of the stator 3 is immersed in the refrigerant. An ATF (Automatic Transmission Fluid) or the like as an operation oil that is used for lubrication of a transmission, power transmission, and the like is preferably used for the refrigerant.

In the following description, a direction along a central axis C that becomes a rotation center of the rotor 4 may be referred to as an axial direction, a direction that is orthogonal to the central axis C may be referred to as a radial direction, and a direction around the central axis C may be referred to as a circumferential direction.

The stator 3 includes a stator core 31 and a coil 32 that is mounted on the stator core 31. The stator 3 allows a rotating magnetic field to act on the rotor 4.

The stator core 31 has a cylindrical shape that is arranged concentrically with the central axis C. The stator core 31 is fixed to an inner circumferential surface of the case 2. Electromagnetic steel sheets are laminated in the axial direction and constitute the stator core 31. The stator core 31 may be a so-called dust core.

The coil 32 is mounted on the stator core 31. The coil 32 includes a U-phase coil, a V-phase coil, and a W-phase coil that are arranged to have a predetermined phase difference with respect to the circumferential direction.

The coil 32 includes an insertion part 32*a* that is inserted through a slot (not shown) of the stator core 31 and a coil end part 32*b* that protrudes in the axial direction from the stator core 31. A current flows through the coil 32, and thereby, a magnetic field is generated at the stator core 31.

The output shaft 5 is supported rotatably by the case 2. The output shaft 5 is connected to the rotor 4 and outputs the rotation of the rotor 4 as a drive force.

The rotor 4 is arranged on an inside in the radial direction with respect to the stator 3 so as to be spaced from the stator 3. The rotor 4 is fixed to the output shaft 5 and is formed to be rotatable integrally with the output shaft 5 around the central axis C.

Figure 2:
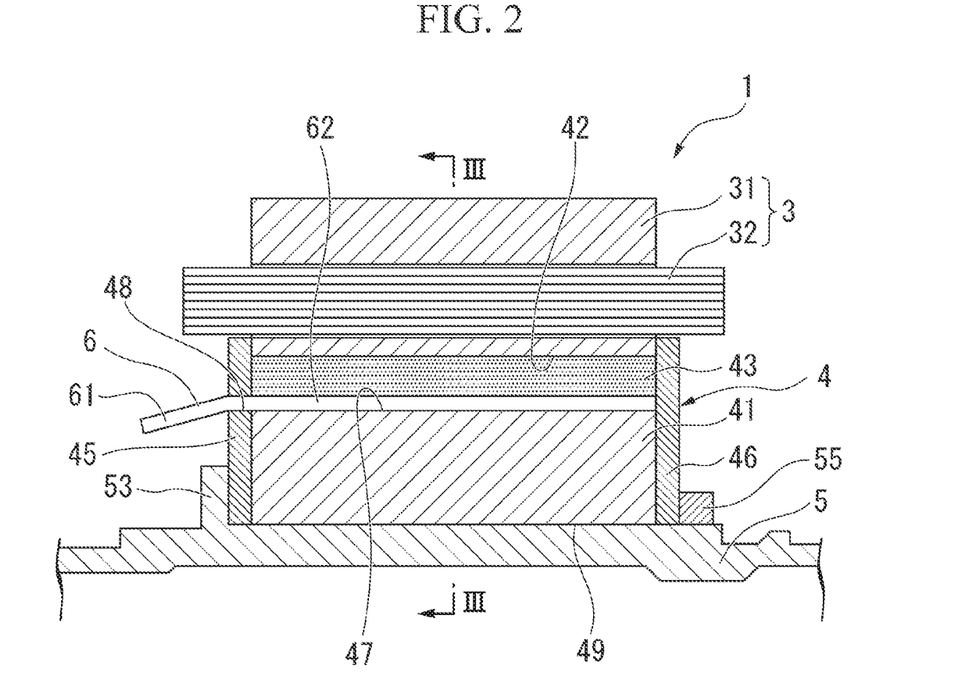
FIG. 2 is a partial cross-sectional view of the rotary electric machine showing a cooling structure of a rotor.

FIG. 2 is a partial cross-sectional view of the rotary electric machine showing a cooling structure of the rotor.

The output shaft 5 includes a boss part 53 that protrudes outward in the radial direction from an outer circumferential surface of the output shaft 5 and a collar 55 that is fixed onto the outer circumferential surface of the output shaft 5 by press fitting or the like. The boss part 53 may be a separate component that is fixed by press fitting or the like similarly to the collar 55.

The rotor 4 includes a rotor core 41, a magnet 43, a pair of end surface plates (a first end surface plate 45 and a second end surface plate 46), and a heat pipe 6.

The rotor core 41 is formed in an annular shape. The rotor core 41 is formed by laminating a plurality of electromagnetic steel sheets along the axial direction. A rotor core penetration hole 49 is formed at the center of the rotor core 41. The output shaft 5 is fixed to the rotor core penetration hole 49, for example, by press fitting or the like.

Figure 3:
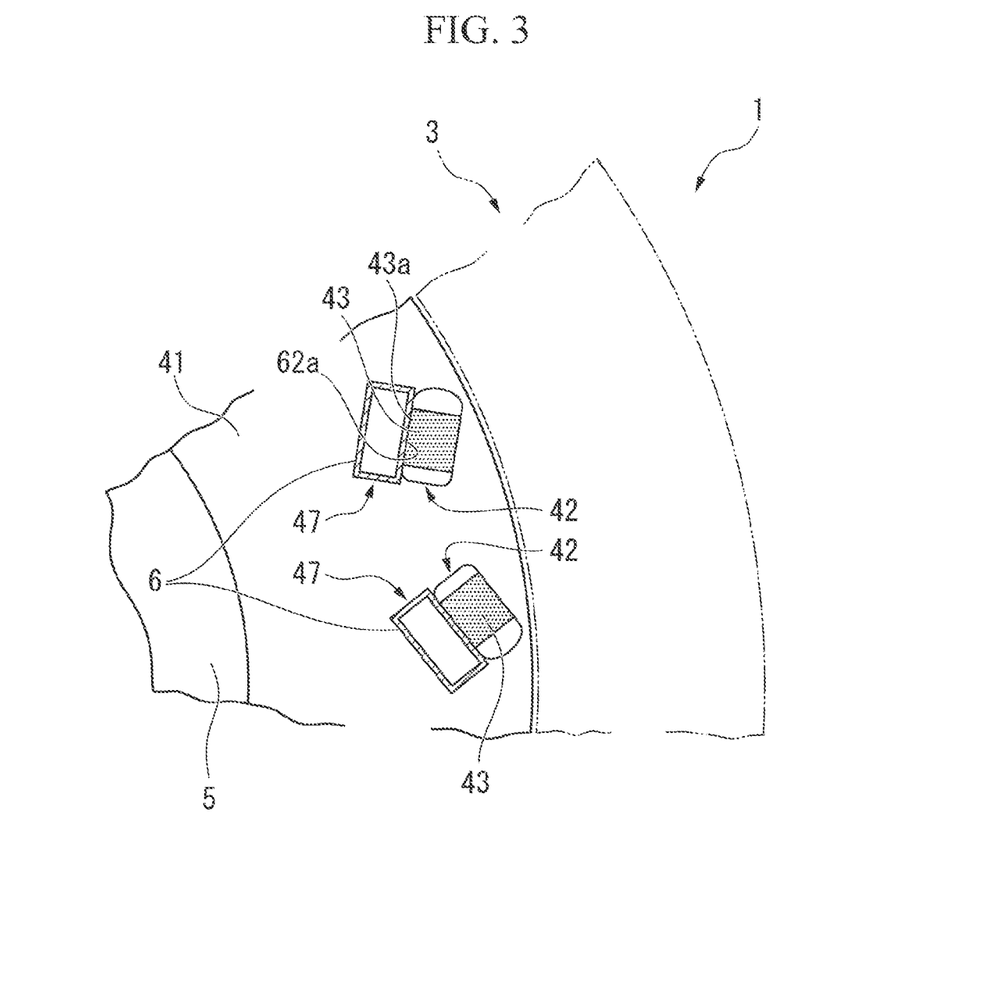
FIG. 3 is a cross-sectional view along a line of FIG. 2 of the rotary electric machine showing the cooling structure of the rotor.

FIG. 3 is a cross-sectional view along a line of FIG. 2 of the rotary electric machine showing the cooling structure of the rotor.

As shown in FIG. 3, a magnet support hole 42 at which the magnet 43 is arranged is formed on an outer circumferential part of the rotor core 41. The magnet support hole 42 penetrates in the axial direction through the rotor core 41 in parallel with the axial direction. A plurality of magnet support holes 42 are formed to be spaced in the circumferential direction. The magnet 43 is inserted in each of the magnet support holes 42.

A heat pipe support hole 47 at which the heat pipe 6 described below is arranged is formed on a further inner side in the radial direction than the magnet support hole 42. The heat pipe support hole 47 penetrates in the axial direction through the rotor core 41 in parallel with the axial direction. The heat pipe support hole 47 extends side-by-side with the magnet support hole 42 at a further inner side in the radial direction than the magnet support hole 42. A plurality of heat pipe support holes 47 are formed to be spaced in the circumferential direction.

The magnet 43 is a rare-earth magnet. Examples of the rare-earth magnet include a neodymium magnet, a samarium-cobalt magnet, a praseodymium magnet, and the like. The magnet 43 is formed in a rectangular shape when seen from the axial direction. A plurality of magnets 43 are arranged uniformly along the axial direction by being inserted in the magnet support hole 42.

A magnet torque is generated at the magnet 43 by a magnetic flux of the magnet 43 and a torque current that flows through the coil 32 of the stator 3. At this time, the temperature of the magnet is increased due to heat generation by an eddy current, heat reception from the coil, and the like. There is a possibility that demagnetization may occur when the temperate of the magnet exceeds a predetermined temperature. Accordingly, in order to prevent the demagnetization, it is necessary to cool the magnet 43. The magnet 43 corresponds to a heat generation body.

As shown in FIG. 2, the first end surface plate 45 is arranged on one side in the axial direction with respect to the rotor core 41. The first end surface plate 45 covers at least the magnet support hole 42 in the rotor core 41 from one side in the axial direction in a state of being pressed into and fixed to the output shaft 5. A penetration hole 48 that penetrates in the axial direction through the first end surface plate 45 is formed on the first end surface plate 45. A plurality of penetration holes 48 are formed to be spaced in the circumferential direction. The heat pipe 6 described below is inserted in each of the penetration holes 48.

The second end surface plate 46 is arranged on another side in the axial direction with respect to the rotor core 41. The second end surface plate 46 covers at least the magnet support hole 42 in the rotor core 41 from another side in the axial direction in a state of being pressed into and fixed to the output shaft 5.

Figure 4:
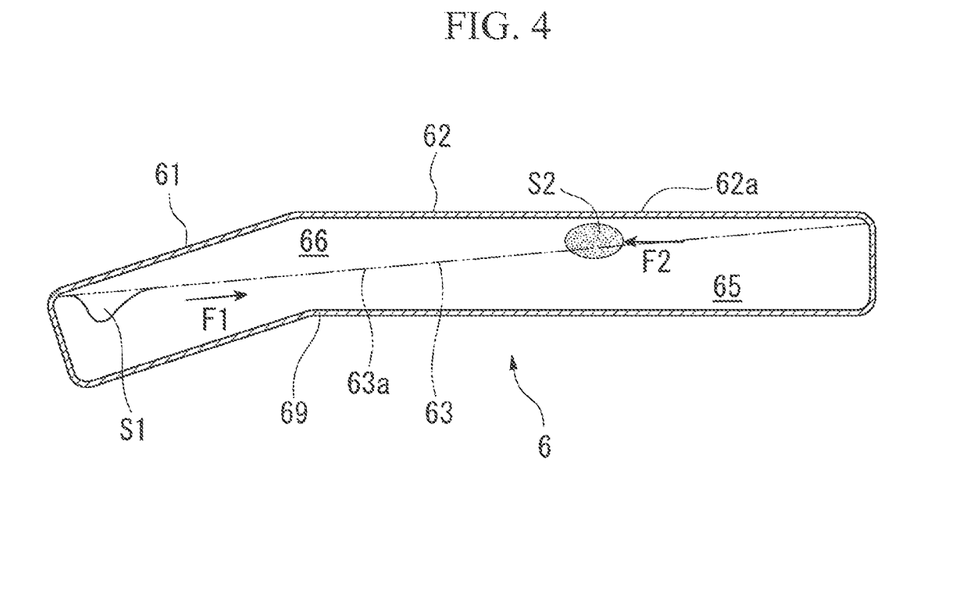
FIG. 4 is a cross-sectional view showing a basic configuration of a heat pipe according to the first embodiment.

FIG. 4 is a cross-sectional view showing a basic configuration of the heat pipe according to the first embodiment.

The heat pipe 6 is formed in a hollow rectangular column shape of, for example, a metal having a good thermal conductivity such as a copper. The heat pipe 6 includes a heated part 62, a cooled part 61, a film body 63, a first space 65, and a second space 66.

The heated part 62 linearly extends. The heated part 62 is hollow. A cross-sectional shape that is orthogonal to the longitudinal direction of the heated part 62 is a rectangular shape.

The cooled part 61 is arranged on one side in the longitudinal direction of the heated part 62. The cooled part 61 linearly extends. The cooled part 61 is shorter than the heated part 62. The cooled part 61 is connected to the heated part 62 in a state of being slanted with respect to the heated part 62. The cooled part 61 is hollow and communicates with the heated part 62. A cross-sectional shape that is orthogonal to the longitudinal direction of the cooled part 61 is a rectangular shape. A connection part between the heated part 62 and the cooled part 61 is a bend part 69 that is bent at an obtuse angle.

The film body 63 is provided throughout the heated part 62 and the cooled part 61. The film body 63 divides the internal space of the heat pipe 6 into the first space 65 in which an operation liquid S1 is present and the second space 66 in which an operation liquid vapor S2 is present. The film body 63 is slanted from one side toward another side in the same direction as the cooled part 61.

A sheet or film which has a porous structure, which has a function capable of performing a gas-liquid separation, through which a gas is capable of passing, and through which a liquid is not capable of passing can be desirably used for the film body 63. Examples of the film body 63 include a high-density polyethylene non-woven fabric, an ultrahigh molecular weight polyethylene porous film, a stretched fluorine resin film, or the like. However, the film body 63 may be another material other than those described above.

A variety of operation liquids S1 are employed in accordance with a heat generation body as a cooling target. For example, in the first embodiment, the cooling target is the magnet 43. In the first embodiment, the temperature range of the magnet 43 is from an ordinary temperature to about 180° C. Accordingly, the operation liquid S1 of the heat pipe 6 of the first embodiment is a liquid having a boiling point at a temperature from an ordinary temperature to about 180° C. For example, water can be desirably used for such a liquid.

The slanted film body 63 is formed, for example, by performing a swaging in which a phase is reversed by 180° at the time of the swaging of both ends of the heat pipe 6. However, the method is not limited thereto, and the film body 63 may be formed by a method other than the above method.

The first space 65 and the second space 66 are partitioned by the film body 63. The cooled part 61 includes the first space 65 and the second space 66 inside the cooled part 61. The heated part 62 includes the first space 65 and the second space 66 inside the heated part 62.

The first space 65 is an internal space that is divided by the film body 63. The first space 65 includes the operation liquid S1 inside the first space 65. According to the film body 63 that is arranged to be slanted, from one side toward another side, the volume of the first space 65 in the cooled part 61 is gradually decreased, and the volume of the first space 65 in the heated part 62 is gradually increased.

The second space 66 is an internal space that is divided by the film body 63. The second space 66 includes the operation liquid vapor S2 inside the second space 66. According to the film body 63 that is arranged to be slanted, from one side toward another side, the volume of the second space 66 in the cooled part 61 is gradually increased, and the volume of the second space 66 in the heated part 62 is gradually decreased.

As shown in FIG. 2 and FIG. 3, the heat pipe 6 having the configuration described above is attached to the rotor core 41. Specifically, the heat pipe 6 is inserted in the heat pipe support hole 47 that is formed on the rotor core 41 and the penetration hole 48 that is formed on the first end surface plate 45. The heat pipe 6 is arranged on a further inner side than the magnet 43 in the radial direction and extends along the axial direction of the rotor core 41. A plurality of heat pipes 6 are arranged to be spaced in the circumferential direction.

An end part on another side in the axial direction of the heat pipe 6 is in contact with an inner surface in the axial direction of the second end surface plate 46. The bend part 69 of the heat pipe 6 is arranged at a further outer position than an outer surface in the axial direction of the first end surface plate 45.

The cooled part 61 is exposed to a further outer position than the outer surface in the axial direction of the first end surface plate 45. The cooled part 61 is slanted away from the central axis C of the rotor core 41 from the one side toward another side. At this time, the film body 63 (refer to FIG. 4) that is slanted in the same direction as the cooled part 61 is also arranged to be slanted away from the central axis of the rotor core 41 from one side toward another side. The first space 65 is present in an inner internal space in the radial direction among the internal spaces that are divided by the film body 63. The second space 66 is present in an outer internal space in the radial direction among the internal spaces that are divided by the film body 63.

The heat pipe 6 is arranged to be in contact with the plurality of magnets 43 that are provided to be spaced in the circumferential direction. Specifically, a side surface (hereinafter, referred to as a "heat generation body opposing surface 62a") that faces outward in the radial direction among side surfaces of the heat pipe 6 is in contact with a side surface (hereinafter, referred to as an "inward opposing surface 43a") that faces inward in the radial direction among side surfaces of the magnet 43.

In a projection plane that is in parallel with the inward opposing surface 43a, at least part of the inward opposing surface 43a of the magnet 43 is overlapped with the heat generation body opposing surface 62a of the heat pipe 6. The cross-sectional shape of the heat pipe 6 in the first embodiment is a rectangular shape but may be, for example, another shape such as a round shape.

Next, an operation of the above rotary electric machine 1 is described.

The heated part 62 receives heat that is generated by the magnet 43 as a heat generation body inside the rotor 4.

The heat that is received by the heated part 62 is transmitted through the inside of the heat pipe 6 and moves to the cooled part 61. The cooled part 61 is cooled by being exposed to the outside of the rotor 4 at a lower temperature than the inside of the rotor 4 and releases the heat that is received by the heated part 62 to the outside of the rotor 4.

At this time, part of the heat that is generated by the magnet 43 is received by the heated part 62. Accordingly, the heat pipe 6 cools the magnet 43 via a heat exchange in the heated part 62 and the cooled part 61.

The above operation is described further in detail with reference to the flow of the operation liquid S1 inside the heat pipe 6.

When the rotor 4 is rotated, the operation liquid S1 that is present inside the first space 65 propagates on a film body surface 63a in the first space 65 and moves to the heated part 62 due to a centrifugal force (refer to an arrow F1 in FIG. 4). The heated part 62 receives external heat that is generated by the magnet 43 and the like and allows the heat to be transmitted to the operation liquid S1 that is present inside the heated part 62. The operation liquid S1 that is evaporated in the first space 65 becomes the operation liquid vapor S2, passes through the film body 63, and moves from the first space 65 to the second space 66. The operation liquid vapor S2 moves to the cooled part 61 (refer to an arrow F2 in FIG.

4) due to a pressure difference, is then cooled in the first space 65 at the cooled part 61, and becomes a liquid (that is, the operation liquid S1) again. The operation liquid S1 again moves propagating on the film body surface 63a in the first space 65 due to a centrifugal force and is supplied to the heated part 62.

That is, in the second space 66, the operation liquid vapor S2 that is heated and vaporized moves from the heated part 62 to the cooled part 61 due to the pressure difference, and in the first space 65, the cooled operation liquid S1 moves in a direction from the cooled part 61 to the heated part 62 due to the centrifugal force.

As described above, by repeating the cycle of evaporation and condensation of the operation liquid S1 in the heat pipe 6, a heat exchange is effectively performed between the heated part 62 and the cooled part 61, and the heat of the magnet 43 is released.

Accordingly, the heat pipe 6 cools the magnet 43 by the circulation of the operation liquid S1 during the rotation of the rotor 4 in which the centrifugal force works.

The rotary electric machine 1 of the first embodiment includes the heated part 62 of the heat pipe 6, the heated part 62 extending so as to be parallel with the central axis of the rotor 4, and the cooled part 61 that is arranged on one side in the longitudinal direction of the heated part 62, and the cooled part 61 is slanted away from the central axis from the one side in the longitudinal direction toward another side. Therefore, the operation liquid vapor S2 that is evaporated at the heated part 62 in the internal space of the heat pipe 6 moves to the cooled part 61 due to a pressure difference, is then cooled at the cooled part 61, becomes a liquid (that is, the operation liquid S1) again, moves propagating on the wall surface of the cooled part 61 due to a centrifugal force, and is supplied to the heated part 62. Thereby, the operation liquid S1 is able to cool the magnet 43.

Therefore, according to the first embodiment, compared to the related art, it is possible to effectively performing a cooling during the rotation of the rotor 4 in which a strong centrifugal force works.

In the first embodiment, the heated part 62 is accommodated inside the rotor 4, and the cooled part 61 is exposed to the outside of the rotor 4 at a lower temperature than the inside of the rotor 4. Therefore, the cooled part 61 is actively cooled in accordance with the rotation of the rotor 4.

According to this configuration, compared to a case where the heat pipe 6 is arranged inside the rotor 4 and the output shaft 5, it is possible to make the heat exchange more efficient.

Specifically, when the rotor of the first embodiment is applied to a rotary electric machine having a cooling means using a refrigerant liquid, the cooled part 61 is cooled also by the coolant liquid, and therefore, it is possible to provide a rotor having a further high-performance cooling structure.

Further, in the first embodiment, the heat pipe 6 and the magnet 43 are in contact with each other, and therefore, the heat pipe 6 further directly receives the heat of the magnet 43 and cools the magnet 43.

According to this configuration, compared to a case where the heat pipe 6 is arranged at a position that is separated from the magnet 43, it is possible to make the heat exchange more efficient.

Second Embodiment

Next, a second embodiment according to the present embodiment is described. The second embodiment is different from the above embodiment in that a heat pipe 6 in which the film body 63 (refer to FIG. 4) in the first embodiment is omitted is used in the second embodiment.

Figure 5:
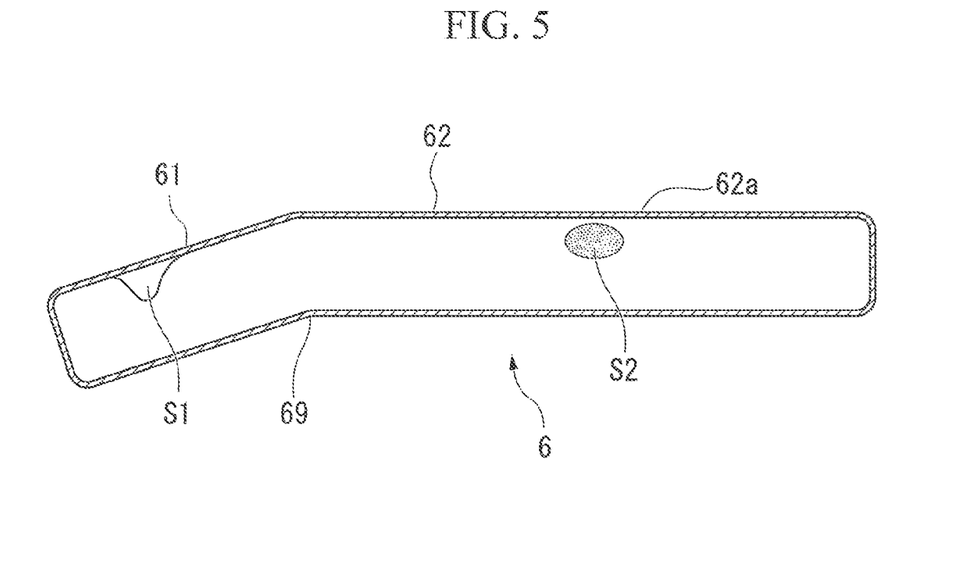
FIG. 5 is a cross-sectional view showing a basic configuration of a heat pipe according to a second embodiment.

FIG. 5 is a cross-sectional view showing a basic configuration of a heat pipe according to the second embodiment. In the following description, a configuration similar to that of the first embodiment described above is given by the same reference numeral, and description of the configuration may be omitted. Further, FIG. 1 to FIG. 3 can be referred to with respect to a reference numeral according to a configuration other than the configuration described in FIG. 5.

The heat pipe 6 includes the heated part 62 that extends so as to be parallel with the central axis of the rotor 4 and the cooled part 61 that is arranged on one side in the longitudinal direction of the heated part 62, and the cooled part 61 is slanted away from the central axis C from the one side in the longitudinal direction toward another side. The operation liquid S1 and the operation liquid vapor S2 are present in the heat pipe 6.

According to this configuration, when the rotor 4 is rotated, the operation liquid S1 propagates on an internal surface of the cooled part 61 and moves to the heated part 62. The operation liquid vapor S2 that is evaporated at the heated part 62 moves to the cooled part 61 due to a pressure difference, is cooled, becomes a liquid (that is, the operation liquid S1) again, then propagates again on the internal surface of the cooled part 61 due to a centrifugal force, and moves to the heated part 62.

Accordingly, the heat pipe 6 cools the magnet 43 by the circulation of the operation liquid S1 during the rotation of the rotor 4 in which the centrifugal force works. The second embodiment provides operations and advantages similar to those of the first embodiment described above, and according to the second embodiment, it is possible to reduce the number of components and to simplify the configuration since it is not necessary to form the film body 63.

The technical scope of the present invention is not limited to the embodiments described above, and a variety of changes can be made without departing from the scope of the invention.

The above embodiment is described using an example of a so-called IPM rotor in which the magnet 43 is embedded in the rotor 4; however, the application of the present invention is not limited to the IPM rotor. Accordingly, the rotary electric machine 1 may be a SPM motor in which a magnet is bonded to a surface of a rotor.

Further, a configuration element in the embodiments described above can be appropriately replaced by a known configuration element without departing from the scope of the invention, and the modified examples described above may be appropriately combined.

What is claimed is:

1. A heat pipe that is arranged around a central axis of a rotation body, the heat pipe comprising:
   an operation liquid that is provided in an internal space of the heat pipe and that allows heat to move via evaporation and condensation;
   a heated part that extends so as to be parallel with the central axis, that receives heat from a heat generation body which is included in the rotation body, and that is heated; and
   a cooled part that is arranged on one side in a longitudinal direction of the heated part and that is cooled; and
   a film body that is provided throughout the heated part and the cooled part, that divides the internal space into a first space in which the operation liquid is present and a second space in which an operation liquid vapor is present, and that is capable of performing a gas-liquid separation, wherein the cooled part is slanted away from the central axis of the rotation body in a direction from the one side in the longitudinal direction of the heated part toward another side in the longitudinal direction of the heated part, and the film body is slanted away from the central axis of the rotation body the one side toward the other side.

2. A rotor, comprising:

a rotor core;

a magnet that is arranged along an axial direction of a central axis of the rotor core; and a heat pipe that is arranged around the central axis of the rotor core, wherein the heat pipe comprises:

an operation liquid that is provided in an internal space of the heat pipe and that allows heat to move via evaporation and condensation;

a heated part that extends so as to be parallel with the central axis, that receives heat from the magnet, and that is heated;

a cooled part that is arranged on one side in a longitudinal direction of the heated part and that is cooled; and a film body that is provided throughout the heated part and the cooled part, that divides the internal space into a first space in which the operation liquid is present and a second space in which an operation liquid vapor is present, and that is capable of performing a gas-liquid separation, wherein the cooled part is slanted away from the central axis of the rotor core in a direction from the one side in the longitudinal direction of the heated part toward another side in the longitudinal direction of the heated part, and the film body is slanted away from the central axis of the rotor core from the one side toward the other side.

3. The rotor according to claim 2, wherein the heated part is arranged inside the rotor, the cooled part is arranged outside the rotor, and the heated part is in contact with the magnet.

4. A rotary electric machine, comprising the rotor according to claim 2.

5. A rotary electric machine, comprising the rotor according to claim 3.

* * * * *